United States Patent [19]

Carver et al.

[11] Patent Number: 5,268,844
[45] Date of Patent: Dec. 7, 1993

[54] ELECTRONIC DIGITAL POSITION AND NAVIGATIONAL PLOTTER

[76] Inventors: Christopher S. Carver; Christopher Carver, both of 1695 Stephens Dr., Wayne, Pa. 19087

[21] Appl. No.: 525,696

[22] Filed: May 21, 1990

Related U.S. Application Data

[63] Continuation-in-part of Ser. No. 319,350, Mar. 6, 1989, abandoned.

[51] Int. Cl.$^5$ .............................................. G06F 15/50
[52] U.S. Cl. .................................. 364/443; 364/449; 342/452; 73/178 R
[58] Field of Search .................. 364/443, 444, 449; 342/452; 340/990, 995; 73/178 R; 33/1 M

[56] References Cited

U.S. PATENT DOCUMENTS

| | | | |
|---|---|---|---|
| 4,053,893 | 10/1977 | Boyer | 342/452 |
| 4,192,002 | 3/1980 | Draper | 364/449 |
| 4,393,448 | 7/1983 | Dunn et al. | 364/449 |
| 4,428,057 | 1/1984 | Setliff et al. | 364/444 |
| 4,437,085 | 3/1984 | Salant | 364/444 |
| 4,796,190 | 1/1989 | Cummings | 364/443 |
| 4,862,374 | 8/1989 | Ziemann | 364/449 |
| 4,888,699 | 12/1989 | Knoll et al. | 73/178 R |
| 4,939,661 | 7/1990 | Barker et al. | 364/443 |

FOREIGN PATENT DOCUMENTS 2043909 10/1980 United Kingdom.
2068546 8/1981 United Kingdom.

*Primary Examiner*—Gary Chin
*Attorney, Agent, or Firm*—John P. Blasko

[57] ABSTRACT

An electronic digital plotter for navigators which relieves the rigors of mechanical manual plotting of position on a chart. The plotter utilizes either a flexible or rigid board employing electromagnetic or capacitive resistance technology. It makes use of a fixed X/Y coordinate system to generate latitude and longitude coordinates from a chart overlay. The plotter employs a pencil or pen type stylus with interchangeable cartridge to locate position, derived from electronic position information on the board and hence on the chart. By comparing the location of the stylus to the input data, the plotter directs the user to the input location utilizing a visual, bullseye director display. Given ship's position, on a dead reckoning track or expected destination or waypoint, the plotter gives course, speed distance, and transit time. The plotter can also accept inputs from hand bearing compass or ship's heading compass. The plotter can be used to insert preselected positions into an electronic navigator or a preselected course into an autopilot.

20 Claims, 7 Drawing Sheets

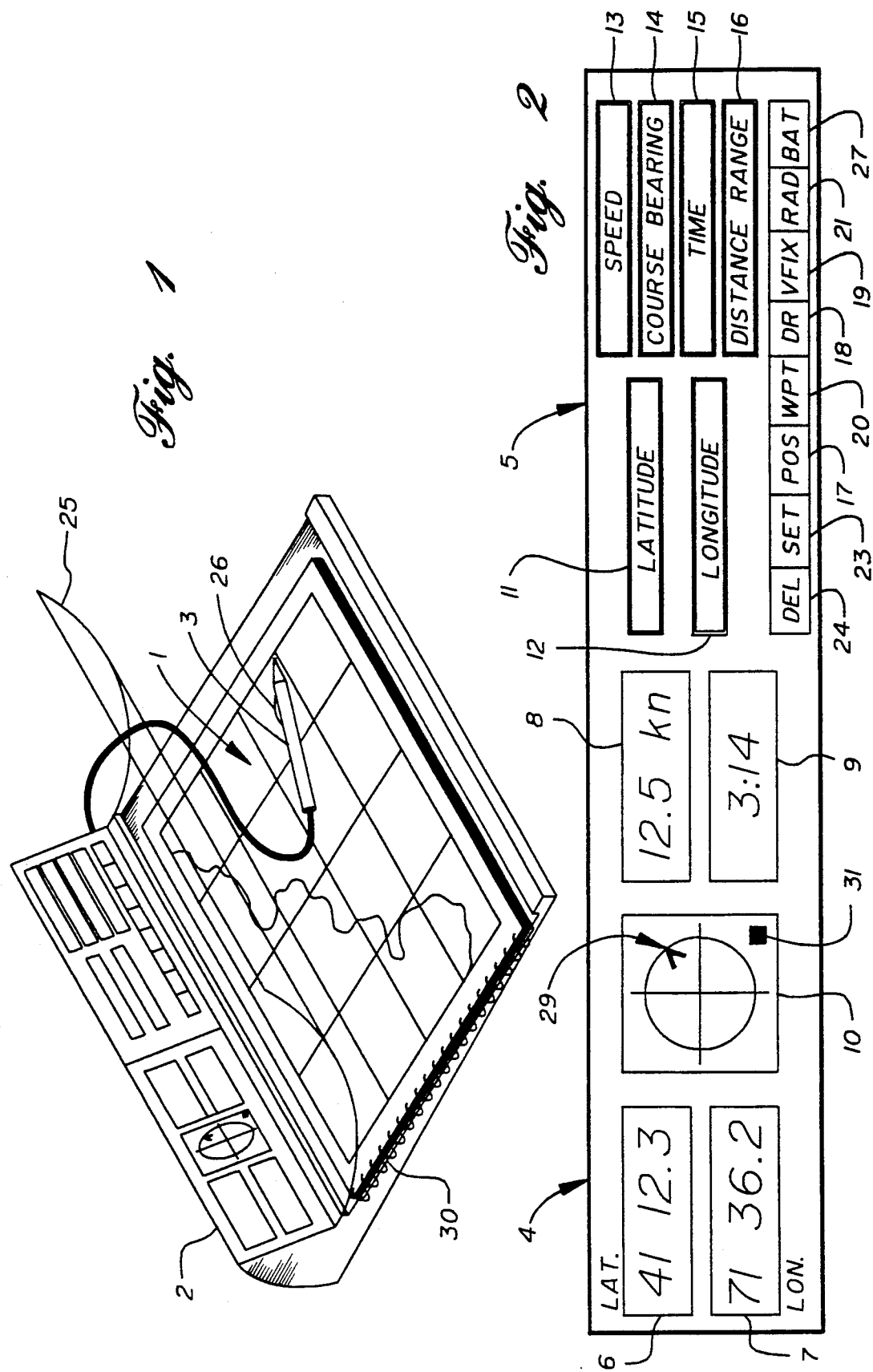

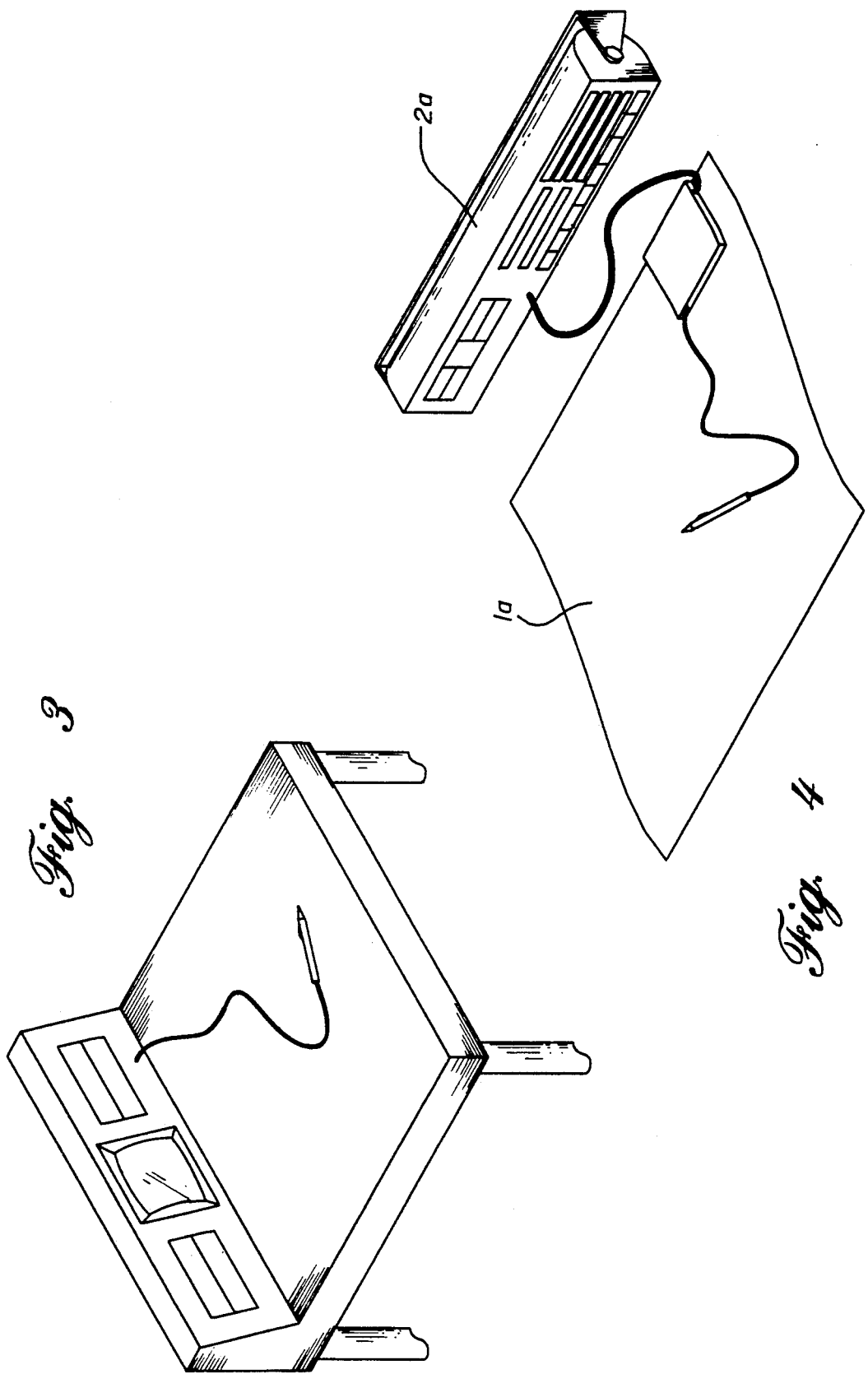

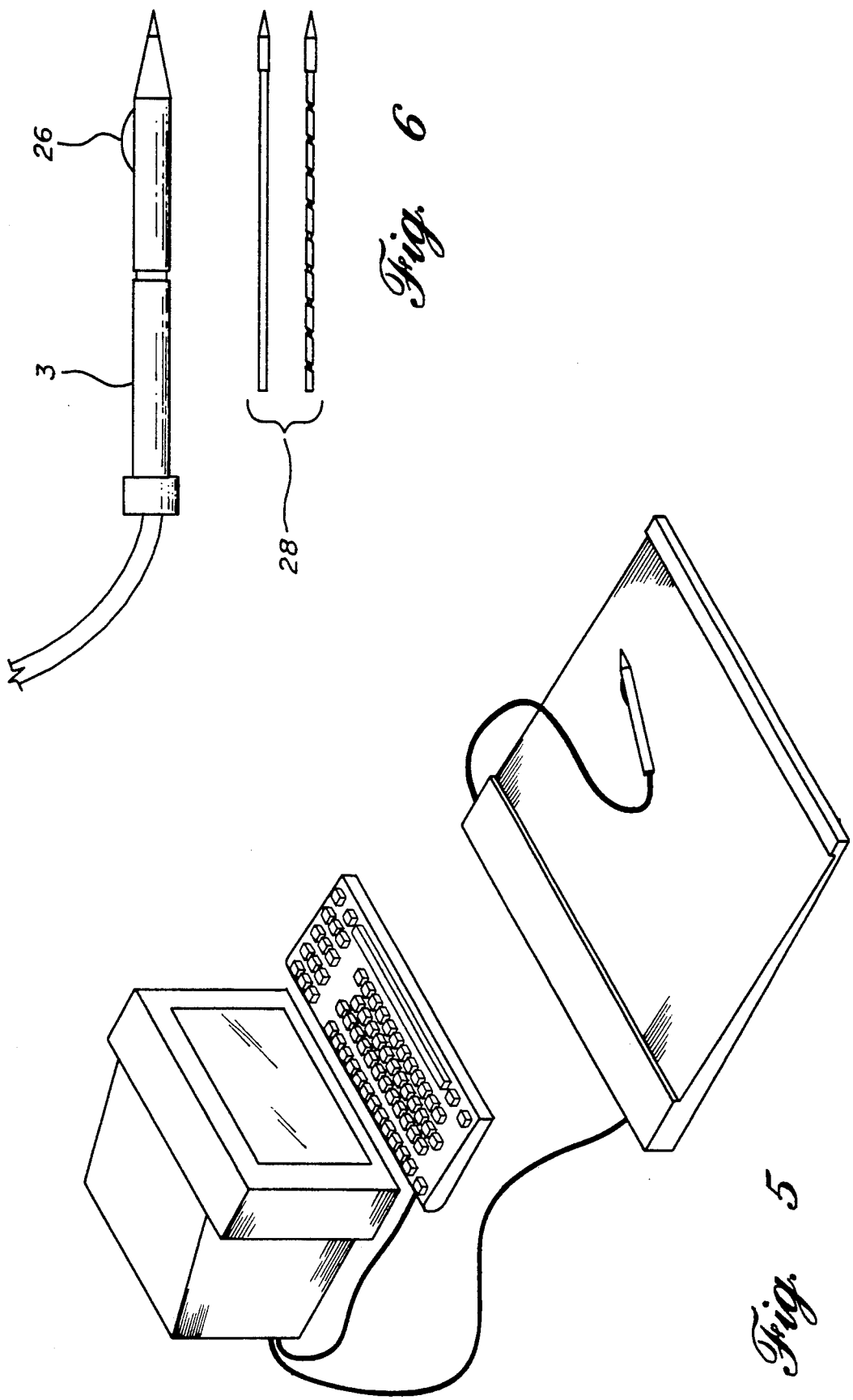

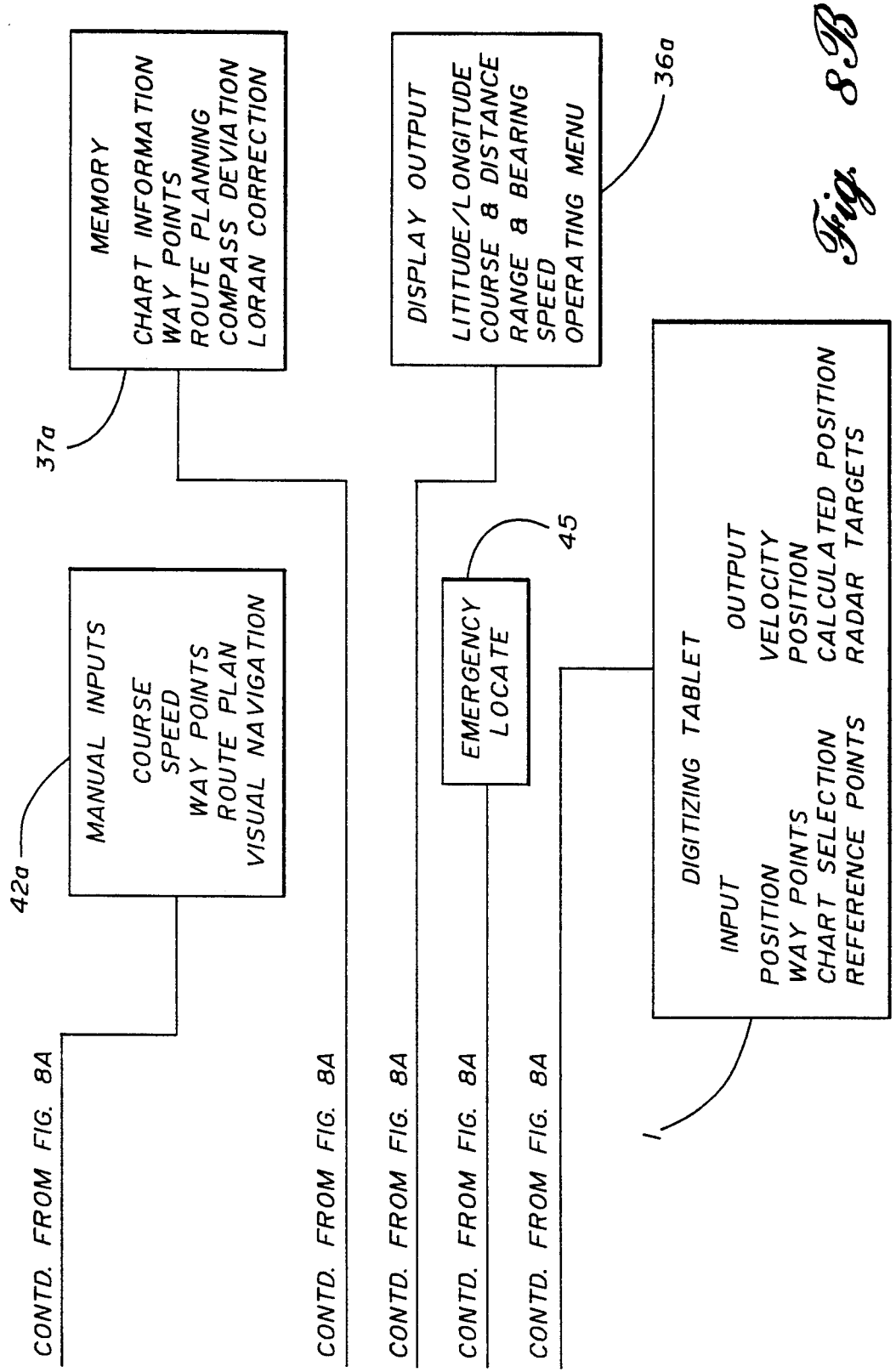

ELECTRONIC DIGITAL POSITION AND NAVIGATIONAL PLOTTER

This application is a continuation-in-part of application Ser. No. 319,350, filed Mar. 6, 1989, now abandoned.

BACKGROUND OF THE INVENTION

There exists an impetus to refine the accuracy of navigation piloting techniques now that electronic devices are capable of so accurately fixing a vessel's position. With this capability, it is imperative that a skipper be able to predict where the vessel is going to be in the immediate future with equivalent accuracy. Only in the last several years has the price and durability of electronic navigation gear allowed the presence of high accuracy navigation aboard anything other than the most sophisticated ships.

The use of electronic charts in disc or compact disc form and a television monitor display is current technology. An example of this usage is found in the Setliff et. al. patent No. 4,428,057. At present this technology is not well adapted to shipboard use, lacks the clarity of information available on the printed chart, and is alien to the navigator's habits and practices.

Up until recently there existed little expertise in the area of digitizing tablets for the conversion of X/Y coordinates into digital information. With the innovation of flexible, durable and inexpensive plotting boards, the conception of a plotting board for use by a large portion of the seagoing population is feasible.

There have been recent attempts to use plotting board technology to assist navigators. One such current device, commercially identified as the Yeoman Potter, employs a mouse type unit which is run over a chart adapted to be clipped onto a rudimentary digitized mat. The mouse comprises a small display window which reads out longitude and latitude inputted from an electronic navigator, such as LORAN. The mouse also includes a circular lens which attempts to locate the position on the chart. This device has many distinguishing, limiting features and disadvantages. Most significantly, its functions are severely restricted since it is capable only of one way communication; that is, it can only receive electronic signals, not input them. This shortcoming is most critical, for instance, in waypoint navigation where the use of pre-set waypoints, inputted into an electronic navigation system or autopilot, is desired. In addition, the mouse type unit is cumbersome to the average sailing vessel use. It is not natural for the navigator, who prefers and can more easily control pencil devices. The mouse's displays are limited and not easily readable or conducive to efficient viewing. The locating lens method is also inefficient. The configuration of the board in this device does not readily accept charts in seagoing conditions. It is not adapted to receive navigational charts and cannot read through a stack of charts.

SUMMARY OF THE INVENTION

It is the object of the present invention to overcome the limitations and disadvantages of prior devices and for improving the speed and accuracy of charting techniques. The present invention uses the digital output of modern electronic navigational instruments, a digitizing tablet for the conversion of X/Y coordinates into digital and graphic information, in coordination with the printed nautical chart. More particularly, this invention enables the navigator to rapidly convert information derived from electronic position information in NMEA 0183 format, now available from such electronic navigator devices as LORAN C, SATNAV, GPS (Global Positioning System receiver), radar, or fluxgate compasses, to notations on a nautical chart. These notations include, but are not limited to, position, ranges, bearings, dead reckoning tracks, time, course, speed, and current set and drift. The invention also allows the input of data into electronic navigators in order to perform additional functions such as for waypoint navigation techniques.

The digital board, which may be either rigid or flexible (for ease of storage) in nature, is specifically sized to receive standard NOAA charts, as well as commercially available chart books. A tertiary size will accommodate charts of various foreign government formats, such as Canadian Hydrographic and British Admiralty standardized sizes.

The board is connected to a display console which shows various critical readouts, e.g. latitude/longitude, speed, course, bearing, time, distance, and range. The console also comprises a bullseye director display, which shows chart orientation (e.g. North) and directs a user to the vessel's exact position on a chart. Mode switches, as well as switches allowing for the inputting of speed, time, bearing, range and longitude and latitude, are also located on the console.

Separate from but connected to the console is a unique custom designed pen/pencil-like cursor or stylus which is more versatile and natural to the use of a navigator. It comprises an interchangeable cartridge to allow the use of either pencil or pen functions. The pencil stylus comprises an actuating switch which is capable of pinpointing and memorizing chart position. By comparing the location of the stylus on the chart to input data, the plotter directs the user to the input location utilizing the director display. The director shows which way and how far to move the stylus pencil in order to locate the correct position on the chart. The stylus/board arrangement has the capability of accurately "reading through" a stack of charts up to $\frac{1}{2}''$ thick, laying on the digitizing board.

The invention provides its users with information from the plotting board that was previously only available using manual techniques. For instance, given a ship's position on a dead reckoning track (position as a function of time along a predetermined course), expected destination, or waypoint (location enroute to the destination), the invention gives the user course, speed, distance or transit time. The invention also can accept inputs from a hand bearing compass or a ship's heading compass (both utilizing flux gate technology). From this information, position information can be derived for either a fix, an estimated position, or a dead reckoning track. In fact, a dead reckoning plot can be automatically maintained continuously, and subsequent estimated positions from single sightings automatically plotted.

A most unique feature of the invention is its capability of having waypoints, both on and off a chart, identified and selected on the chart. Waypoints may be entered to LORAN or GPS on contact with the stylus pencil to steer and/or to run courses entered into an autopilot. The invention also is designed to receive data from and inputs to a radar display, allowing chart verification of a radar "blip" by generating a blip —— activated by contacting the pencil to the chart location.

Since all user inputs are from a menu type display on the console, the need for any corrosion susceptible connections or push button switches is eliminated. The invention has memory capabilities which allow it to "learn" certain chart data in advance; this data includes chart book region (Lat/Lon extremes), page numbers, or NOAA 5 digit or Canadian Hydrographic Chartbook 4 digit identification numbers. With these numbers known, the invention will automatically assign the correct scale, orientation and compass variation to the chart being used on the plotting tablet without user assistance.

For additional versatility, the invention has interface capability to either a personal computer, or "lap top", for use underway or to a modem link to a computer net that allows the transmission of corrections to scaling information or the implementation of a chart verification and correction program from the personal computer. This is similar in format and principal to manual methods using Notice to Mariners, but the digital information is far easier for the average user to implement. For the user who does not have access to these peripheral devices, a pre-programmed RAM device can be inserted to correct chart features. The chart update and correction service will be made available using the pre-programmed format for all government (US and foreign) issued charts.

The software is also able to continually, or nearly continuously, calculate visual fixes from simultaneous or continuous hand bearing or alidade inputs. This feature is a function of the hardware configuration as well as the software. The invention calculates a similar fix from radar information. For the advanced applications, the software will allow the integration of visual bearings, radar fixes, and other piloting information to create a fix. This fix is either a running fix or an estimated position based on the users interface capabilities and needs.

The invention can be fully portable, operating on a (thirty hour life) battery, or an optional 12 V or 110 V power supply. For the larger format NOAA or Canadian Charts, the invention may be mounted more permanently under a transparent or translucent table. For the larger format non-portable version, the electronics can either be built into the table or entirely separate from it.

The novel features which are considered as characteristic of the invention are set forth in particular in the appended claims. The electronic digital position and navigation plotter itself, however, both as to its construction and its mode of operation, together with additional features and advantages thereof, are best understood upon review of the following detailed description of certain specific embodiments with reference to the accompanying drawings.

BRIEF DESCRIPTION OF THE DRAWINGS

FIG. 1 is a drawing of the plotter, showing the rigid inset board integral with the console.

FIG. 2 is a drawing of the display and control panels of the console.

FIG. 3 is a drawing of an alternative use of the plotter for use aboard larger vessels.

FIG. 4 is a drawing of the alternative roll-up or flexible plotter board and a separate control and display device.

FIG. 5 is a drawing of a plotter board without inherent software and displays for use as an accessory board device with a personal computer.

FIG. 6 is a drawing of the pencil stylus with interchangeable cartridge.

FIG. 8A and 8B are block diagrams of the software illustrating the operation of the plotter.

DETAILED DESCRIPTION OF THE INVENTION

Figure 7:
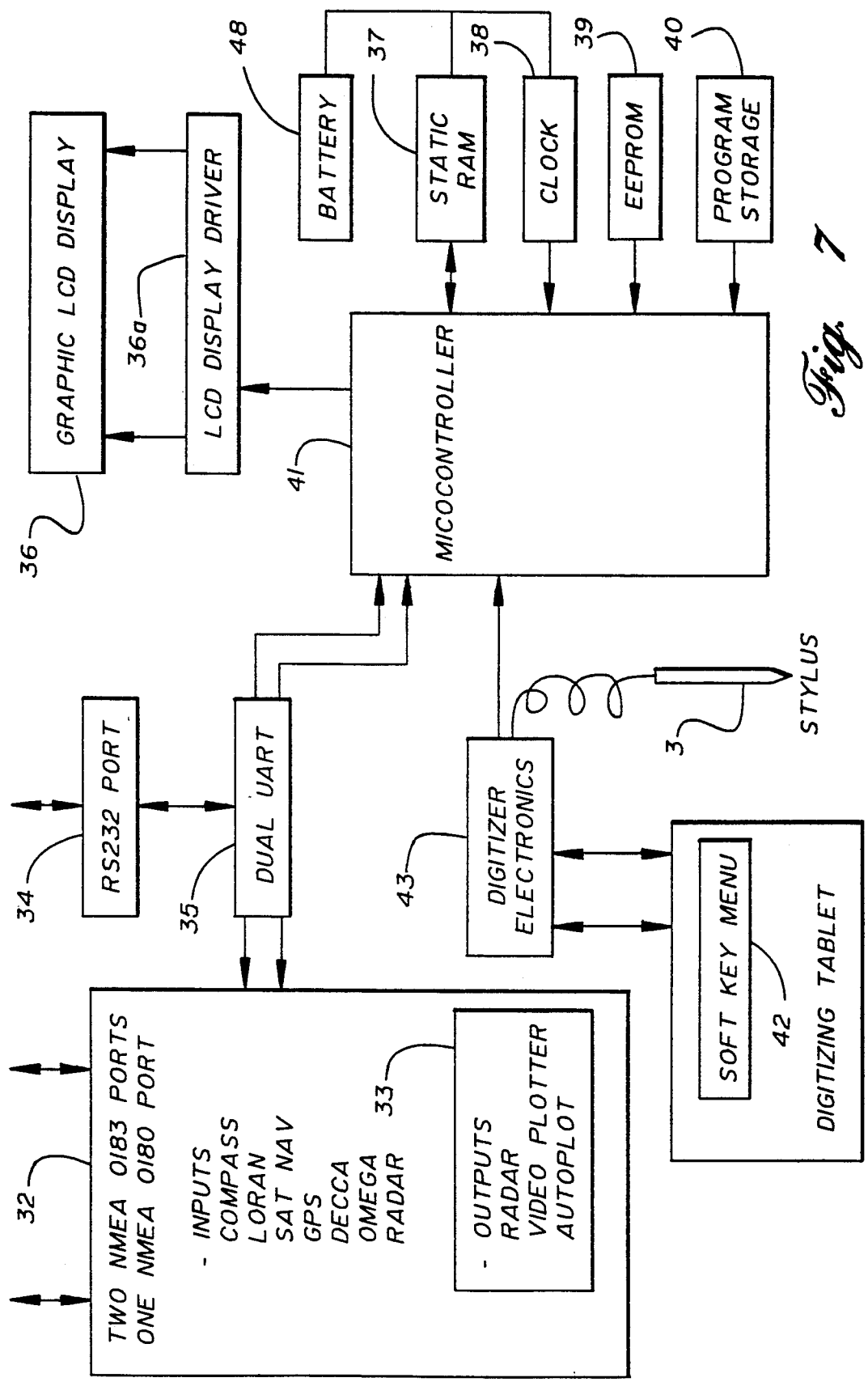
FIG. 7 is a block diagram of the electronic circuitry of the plotter.

The plotter's principal components are the digitizing plotting board or table 1, the console 2, and the plotting pencil type stylus 3. The board 1, as shown in FIG. 1, is inset in order to receive standardized chart books 30 or navigational charts. A clear vinyl cover 25 is provided to protect the chart and board surfaces. The board is capable of accepting and accurately reading through a stack of charts up to $\frac{1}{4}''$ thick. The board uses a fixed X/Y coordinate system to generate latitude and longitude coordinates from the chart or map overlay. The coordinate system uses well-known electromagnetic or capacitive resistance technology. It works as follows: There is a printed grid work matrix of metal runs in an X and Y direction. Current flows through these runs. The stylus location is determined by the stylus sampling the strength of the current on any portion of the tablet and outputting this to the digitizing electronics 42 represented in FIG. 7, which then converts these voltages levels to X/Y location data using known conversion formulas to translate from voltage level to numeric X/Y values. The X/Y data is sent to the Micro Controller 41 shown in FIG. 7, where simple coordinate geometry is used to transform inches to radians which are used for all calculations. As a result of this, the Plotter is able to handle both Marcater and Great Circle calculations. The board itself is less than $\frac{3}{8}''$ thick. The flexible board 1a, shown in the embodiment FIG. 4, is approximately 1/16'' thick.

The board is integrally connected to a console 2 which contains a microprocessor and accompanying circuitry and components. The console's electronics are adapted to accept input from electronic navigator systems such as LORAN C, GPS, and SATNAV. The console consists of an LCD display panel 4 and a control panel 5. The display panel 4 comprises readouts which show indicative navigational information. It is contemplated that various panel readout configurations are possible and the scope of this invention is not to be considered limited by the configuration of the panel shown herein. For purposes of example only, the embodiment in FIG. 2 consists of readout displays showing latitude 6, longitude 7, speed/course/bearing 8, and time/distance/range 9. There is a graphic display or "director" 10 which indicates which way and how far to move the plotting pencil stylus 3. The director 10 is a "bulls-eye" style display which identifies the vessel's actual location 3 by using quadrant locations. It also has an indicator 29 which shows chart orientation. The pencil stylus is directed to the true position of the vessel, as determined by LORAN, GPS, SATNAV, or visual fix. It can also serve to direct the navigator's pencil stylus to a specified waypoint. By use of the director 10, latitude and longitude location of a navigational aid or waypoint can be quickly located in the VISUAL FIX or RADAR mode.

The control panel 5 comprises various slide, menu strip type switches for entering or changing data. Again it is contemplated that various control panel configurations and well-known switches devices are possible and available and the scope of this invention is not to be considered limited by the configuration of the panel shown herein. For purpose of example only, the embodiment in FIG. 2 shows slide switches with a variable scale for inputting and controlling latitude 11 longitude 12, speed 13, course and bearing 14, time 15, distance, and range 16.

The embodiment in FIG. 2 shows eight touch pad switches. The four basic operating modes are controlled by four of the switches. The POSITION mode, actuated by switch 17, utilizes the director 10 to locate a vessel's current position on the plotting surface. The DEAD RECKONING mode, actuated by switch 18, uses either manually or automatically inputted course (Course Over Ground (COG)) and speed (Speed Over Ground (SOG)) to predict future position. VISUAL FIX mode, activated by switch 19, will accept either discrete or continuous bearings and correlate them with navigational aids to calculate position — using the director 10 to display location and accuracy. The WAYPOINT mode, activated by switch 20, will allow insertion of any preselected position into an electronic navigation receiver, e.g. LORAN C, GPS, or a preselected course into an autopilot.

Switch 21 activates the RADAR function which actuates the receipt of data from and inputs to a radar display — allowing chart verification of a radar "blip" by generating a "blip", activated by the act of touching the pencil stylus 3 to a chart location.

BATTERY switch 22 allows for a battery check. SETUP switch 23 allows for programming scales and orientation and inserts of individual charts. DELETE switch 24 allows for deleting back one entry at a time.

The plotting pencil type stylus 3 is both physically connected and electronically linked to the console. The plotter compares the location of the pencil stylus 3 on the board 1 to the input data and directs a user to the input location, utilizing the director 10. The pencil stylus has an enter button 26 on the side, which, when pushed, inputs chart position to the console electronics. Graphite or other erasable and non-erasable cartridges 28, as shown in FIG. 6, can be inserted into the stylus.

FIGS. 3, 4 and 5 illustrate alternative configurations and uses of the digital plotter. FIG. 3 shows a full size plotter intended for permanent installation on a chart table aboard large vessels. FIG. 4 illustrates the manner in which the digital plotter can be comprised of a roll-up or flexible digitizing board 1a. This embodiment shows a control and display console 2a which is separate, albeit connected to the board. FIG. 5 shows the plotting board without inherent software and displays for use as an accessory device with a personal computer programmed to perform in the same manner as the embodiment shown in FIG. 1.

FIG. 7 illustrates the major electrical components of the plotter as well as how reviewed data moves through the various components to generate output information for use by the navigator and for transmission to other essential navigational devises such as radar and autopilot. The information is received in various formats, some of which do not comply with the NMEA (National Marine Electronic Association) standards and this information is reformatted to the industry standard for transmission to these other devices.

FIG. 7 further illustrates various input and output options as follows: There are two bidirectional NMEA 0183 ports and one NMEA 0180 port 32. The input to these ports can come from Loran, Satnav, GPS, Decca, Omega, Radar or an electronic compass. The output from these ports can go to Radar, a Video Plotter, or an Autopilot 33. The Plotter transforms the basic lat/lon data received from position devices or the locational data input by the navigator using a paper chart and reformats this information for transmission to such devices as Radar, Video Plotter, and Autopilot. This information is formatted and transmitted in the form of cross-track error, waypoint number, course and distance, vessel location or radar target location. In addition, the Plotter transmits the data displayed on the graphic LCD display 36 to remote display devices designed to interpret formatted signals. The graphic LCD display is used as the man-machine interface to visually display information. This information is both status and operational information as well as position information. The director 10 in the LCD shows physical location relative to the placement of the stylus on the digitizing tablet 1.

In addition to the NMEA ports there is an RS 232 port 34 which will receive or transmit serial data via the Universal Ascynchronous Receiver/Transmitter, UART 35 which is then passed on through to the Micro Controller 41. The RS 232 port 34 and NMEA 0183 ports 32 are interfaced to the Micro Controller 41 through the UART. The UART provides serial to parallel conversion for information being inputted into the device and for information outputted to external devices 33, including such items as Radar, Autopilot, and Video Plotter.

The UART 35 is connected to the input on one side and transmits parallel data to the Micro Controller on the other side. The Micro Controller 41 samples this data periodically and then stores it in static RAM 37 for use in one or more of the Plotters' many functions.

The Micro Controller 41 is a microprocessor based computing device containing a sixteen bit processor which continuously samples the input data coming from the UART and the command data which originates on the digitizing tablet 1. It has program storage based on 64K of UV erasable EPRON as well as 128K bytes electrically erasable storage which can be altered by the user using the RS 232 port. It also has 32K of static RAM for scratch pad and chart memory. The static RAM is battery backed 48 to create nonvolatile memory.

The information from the digitizing tablet is in two forms. In the one case it is in the form of a serial data output of X/Y coordinates and in the other it is command information generated by the navigator using the stylus 3 to touch the softkey menu 42 to give the Plotter a particular instruction. Each of these instructions has a unique X/Y address and is therefore correctly recognized by the Micro Controller 41. This information must pass through the digitizer electronics 43 before passing on to the Micro Controller 41.

The softkey menu 42 is an area of the digitizing tablet which is identified as a menu area such that when a specific part of the menu is touched with the stylus, a function call is sent to the Micro Controller 41 for interpretation and implementation.

The stylus picks up differing voltage levels and patterns depending upon where it is placed on the digitizing tablet. These different voltage levels and patterns are translated by the digitizer electronics 43 into particular X and Y coordinates which identify the precise location of the stylus. Stylus position has a typical accuracy and repeatability of 0.005 inches. When any chart or map is placed on the digitizing tablet and the stylus is placed over a location on the chart, this location is sent by the digitizer electronics 43 in the form of X/Y data to the Micro Controller 41. The Micro Controller then converts this to correct lat/lon based on known and previously entered reference points of the map or chart. This information is then sent to the LCD display 36 via the LCD Display Driver 36a. The Micro Controller is interfaced to the LCD display driver which controls the dot matrix LCD display 36, portraying both the correct alphanumeric data and the dynamic cursor display which reflects the location of the stylus 3 on the digitizing tablet 1. The user with the stylus in hand moves the pen across the tablet, can look at the director LCD graphic display, and guide the stylus to a particular location which might represent vessel position, radar target, waypoint or dead reckoning location.

The static Ram 37 contains data which has been processed and parsed by the Micro Controller 41 after it has been received from the input ports and/or the digitizer electronics. This information is continuously sampled and checked for its timeliness before being used to perform any number of the functions performed by the Plotter.

The clock 38 is used by the navigation processor to calculate and maintain an accurate dead reckoning track and perform accurate running fix calculations. The data the Micro Controller must have to do this includes location data entered from the map on the surface of the digitizing tablet and softkey entered data using the stylus. These data entries include location, vessel heading, vessel speed, the location of an object being sighted or visual fix calculations. Latitude and longitude, as received from one or the other of the input ports 32, are compared to dead reckoning data to generate correct set and drift. In these calculations the clock 38 is also required to give estimated vessel location which is compared to actual vessel location and the appropriate vector analysis is then accomplished by the Micro Controller 41. The EPROM 39 contains chart reference data and elements of the operating program. These elements are called upon by the Micro Controller to accomplish the tasks requested by the user. The use of a Boot Code 40 is well-known. It performs diagnostic testing of the system when the power is activated. It provides instructions for the System Processor 44. The Program Memory 39a is a prom which contains constants tables of math functions. The Program Memory also contains programming for the Plotter.

Figure 8A:
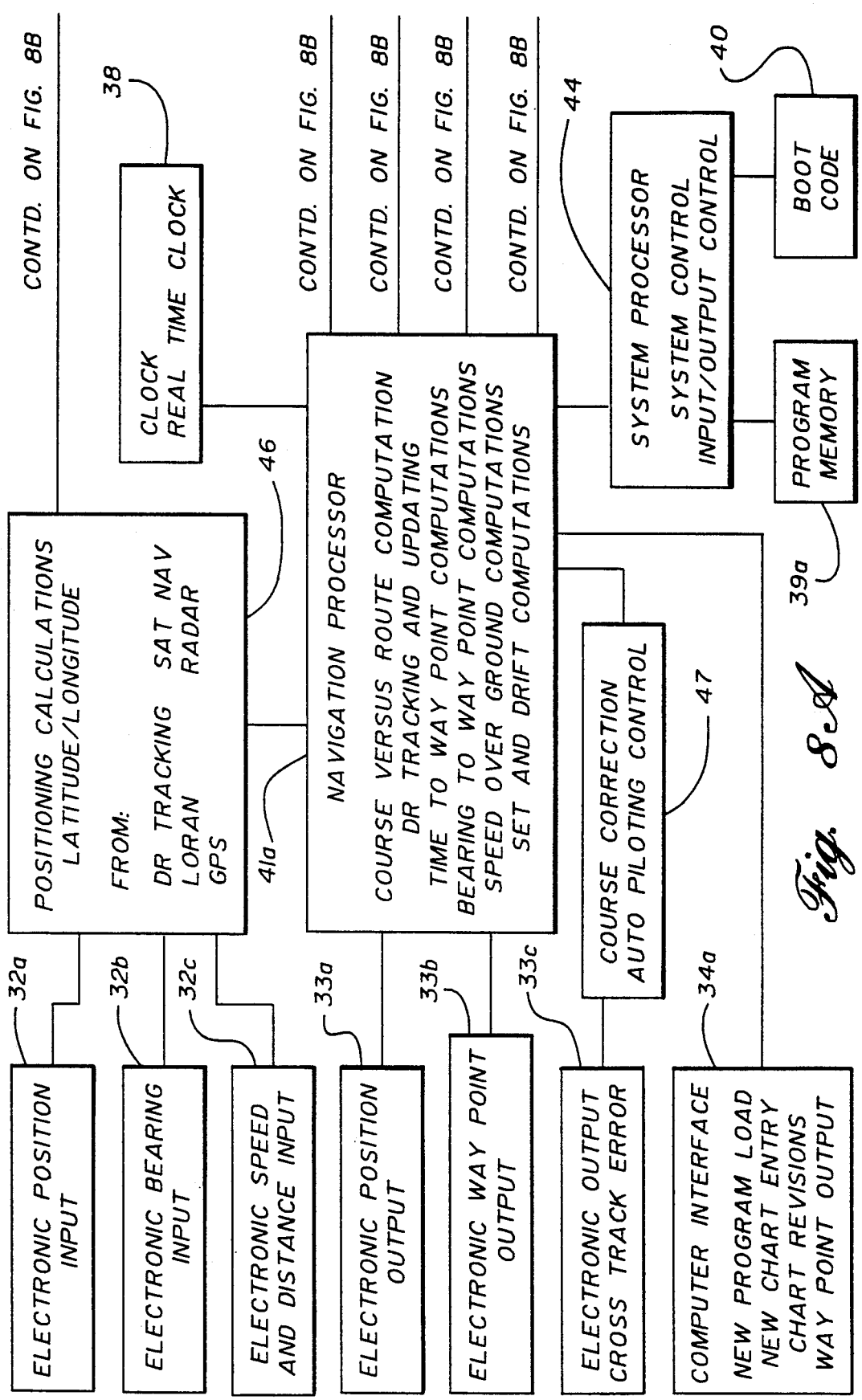

FIGS. 8H and 8B are block diagrams of the software illustrating the operation of the Plotter. Data coming into the navigation processor 41a (identified as the Micro Controller 41 in FIG. 7), comes from two different sources. In the one case the data comes from various electronic devices 32 which provide position data 32a, bearing data 32b, speed and distance data 32c. In the second case, data comes from manual inputs 42a, via the softkey menu 42. Course, speed, waypoint, route plan and visual navigation are entered on the tablet using the stylus 3 as described previously with reference to FIG. 7. The manual inputs 42a allow the navigator to set a course for DR track, to enter vessel speed, to designate waypoints by simply touching the chart, to assign route names, to analyze running time between waypoints at various speeds, and to do complete visual navigating, including obtaining visual fixed, estimated position, and dead reckoning tracks.

In a visual navigation mode, a portion of the initial data is provided by the navigator. Navigation aids, such as buoys, stacks or prominent land features are sighted by the navigator and their observed bearing is entered into the Plotter using the softkey menu 42. Because the Plotter can calculate the X/Y coordinates of every point on the chart which is on the active area of the plotting surface, it is possible for the navigator to simply touch the symbol of the object sighted on the chart using the stylus 3. The Plotter calculates a line of position from the charted object in a direction according to the bearing data entered. This line of position can be in magnetic or true degrees and if magnetic it will be adjusted by the local magnetic variation data for the year according to the navigator's entry under the system set-up mode. There are three choices under the visual navigation mode. These include an estimated position, a two line of position fix and a three line of position fix.

When the Plotter calculates an estimated position it will require that a dead reckoning track be on (running). The plotter maintains a constantly updated DR track based on the navigator's input 42a. When the bearing of a navigation aid is entered, the Plotter locates the vessel's position on the DR track and computes the estimated position. This X/Y location is then converted to lat/lon and displayed 36. The coordinates of the object being sighted are stored in Ram 37, shown in FIG. 8 as memory 37a. The navigator then enters the bearings of objects sighted using the softkey menu 42 and this data is also stored is static RAM 37. Once the sighting data is entered, the Micro Controller 41 performs the necessary calculations to permit the navigator to locate vessel position on the digitizing tablet 1 using the guidance provided by the graphic display 36 with the director 10 and cursor 31 combination.

For a two lines position fix, the navigator uses the stylus 3 to touch the chart symbol of two objects sighted, and then enters the bearing of each of the sighted objects. The X/Y location of each object is stored by the Plotter and the Plotter tags the time of the sighting at the moment the bearing is entered and will later use that time information to compute running fixes. A running fix requires that a DR track be running.

Two lines of position are calculated by the Plotter and their X/Y intersection is displayed in lat/lon coordinates. This position is also made the center of the crosshairs on the director 10 allowing the navigator to use the stylus 3 to locate this point on the chart and director.

If a DR is on, then the first line of position is advanced by the Plotter in a direction and for a distance comparable to the vessel's passage as determined by the differential between the time tag on sighting number one and the time tag on sighting number two.

For a three line position fix, the navigator is prompted to touch three navigation aids on the chart and enter each of their bearings. With the DR's on, as in the case of the two lines of position fix, the line of position to the first and second nav aids will also be advanced along the DR track for the appropriate distance to make the three line position fix also a running fix. In all likelihood, the three line position will not cross at a single point, but will generate a triangle which will vary in size depending upon the accuracy of the navigator's input data. The Micro Processor 41a calculates the geometric center of the triangle and displays the lat/lon of that center. That point also can be located using the director 10 by centering the cursor. In addition, the Micro Processor 41 will calculate the circular Error Probability and display the radium of the circle. This provides the navigator with an evaluation of the relative accuracy of his fix and allows him to trace the parameter of CEP directly on his chart.

The electronic position input data 32a-32c which is used by the positioning calculations 46 originates with such devices as Loran or GPS or Satnav and is then passed on to the navigation processor 41a. This information is used to derive waypoints computation such as time to go and distance to go and bearing to waypoint. The Plotter also calculates speed over ground, set and drift and course over ground. The speed and course data is derived by comparing various lat/log positions and loading the time between these comparisons. From this information it is possible to compute a vessel's heading and its speed. A simple time rate and distance calculation allows the Plotter to predict arrival times or display the effect of different speeds on arrival times. This information can be displayed on the display output 36a which includes latitude and longitude, course, distance, range, bearing, speed as well as containing the operating program menu.

The emergency locate or event function 45 makes it possible for the user to instantly identify vessel location and have a constant display of course and distance to the position which represents the location of the vessel when the locate button was pushed. This is typically used as a safety device in the event of a man overboard situation. It is also used by fisherman to mark events which are strikes or net snags. It is possible to reconstruct at a later time and plot the precise location of each of these events.

Data outputs include position 33a, waypoint 33b, and cross-track error data 33c. In computing cross-track error which is required by the vessel's Autopilot 33, the Plotter establishes a start point and, with a known destination and based on position and intended route, the Plotter constructs a run line course between the start point and the destination. Sampling latitude and longitude, the Plotter will determine how far off the run line the vessel is and transmit the course correction 47 in the form of cross-track data to the vessel's autopilot. The Plotter uses the Loran data or other position inputs to determine the vessel position. This position is then compared to the route the navigator initially planned. Any deviation from the planned route is used to format instructions to direct the Autopilot 33 to allow it to bring the vessel back to the planned route.

Waypoints, which are specific locations along a particular route, can be entered by touching the chart with the stylus 3 on the waypoint location or manually entering the latitude and longitude of the waypoint on the softkey menu 42. Each waypoint is identified by number and location. The course and distance between each or any two waypoints are calculated. The navigator can create a route which contains several waypoints and then transmit this route data, via the Course Correction Autopilot Control 47, to the Autopilot for steering information and to a Radar for display purposes. The Autopilot will guide the vessel to the next waypoint in the sequence and once it is reached (or the closest point of approach is reached), the Plotter will sequence to the next specified waypoint and indicate course to steer to the Autopilot. The number of this next waypoint will be displayed on the Radar along with the course and distance to run to reach it.

For those radar's so equipped, the Plotter formats the data in such a way as to display a waypoint position on the radar screen which is relative to ships' position. This information is formatted to industry recognized standards. If the Plotter receives non-standard data, it makes the appropriate conversion so that devices which would otherwise be incompatible can, in fact, interface through the Plotter.

It is also possible to input or output to a computer 34l using the RS 232 port 34 described in FIG. 7 as a computer interface. New User software can be loaded, new chart reference data and, revisions to chart reference data can also be entered and waypoint descriptions can be put through this RS 232 port using a personal computer and a printer. It is possible for the navigator to print out a list of waypoints, their latitude and longitude, course as well as the course and distance between waypoints. The Plotter is able to store in static RAM 37 up to 100 waypoints and it is possible to offload these waypoints using a personal computer, making it possible to store an additional 99 waypoints.

The final key element on FIG. 8B is the digitizing pad 1 which is discussed when referring to FIG. 7. The point illustrated in the software diagram is that the digitizing pad is both an input and output device. Various data elements, position, waypoints, chart number and reference points are used by the navigation processor 41 to answer the questions reflected under output in the digitizing pad 1. These answers include velocity position, the calculated position, and radar target location.

Figure 9:
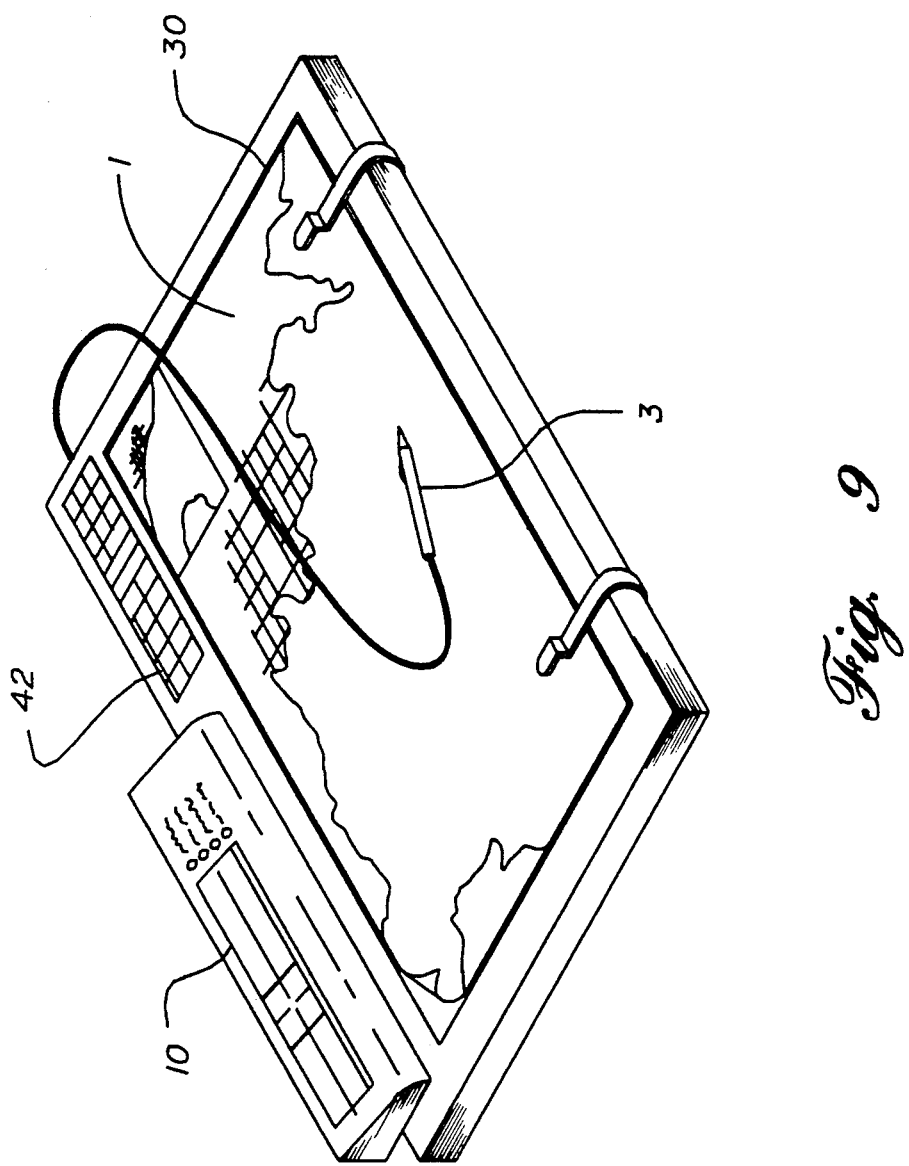
FIG. 9 is a drawing of an alternate embodiment of the plotter.

FIG. 9 is an alternate embodiment of the Plotter, showing the rigid board 1 with a data cable console and director 10, chart 30, stylus 3, and menu strip 42.

The following description of some of the operational functions of the digital plotter are presented for purposes of illustration only.

POSITION MODE. This mode is the default mode from all other modes. It can also be entered by depressing POSITION switch 17. This is a routine mode for most coastal piloting. The POSITION mode evolves as follows:

Press switch 17 to locate LORAN, GPS or SAT-NAV position using the director 10. If an interface with NMEA 0183 formation information is present the director 10 locates the vessel at the center of its cross hairs. This interface would only not be available if a LORAN, etc. were not functioning. All LORANS can interface with the plotter provided they have an output or auxiliary display port (reading NMEA 0183 format information).

If no interface is present, manually enter the latitude and longitude 11, 12 and then press enter switch 26 on stylus pencil 3. Even more simply, while the display 6, 7 is flashing (awaiting a position from any source), move the pencil stylus 3 about the chart until the desired latitude and longitude is displayed and then press enter 26 to input this position into the plotter.

This significantly simplifies the coastal piloting disciplines and navigation routines for the navigator who does not have an electronic fix source, such as LORAN. He can now utilize visual or radar sites with much greater precision.

In the POSITION mode, courses can be plotted on and off the chart. Place the pencil stylus 3 on any point on the chart, in this mode and immediately read the latitude 6 and longitude 7, course 8 and distance 9 to that destination from your current location.

Speed and time are not active in the POSITION mode. The navigator can quickly evaluate various courses and destinations with this feature. To find speed and time change to the DEAD RECKONING mode 18.

In the POSITION mode, the pencil stylus 3 can also be used to trace a track or "free hand" a very accurate course. A previously unheard of technique.

A most useful feature of the POSITION mode is the rapid location of the vessel, on the chart, by the distracted or busy navigator. Touch POSITION 17 and move the pencil stylus 3 around following the director 10. The pin point pencil stylus 3 location on the chart is the position to the best accuracy of the GPS or LORAN receiver.

For navigators who prefer the accuracy of "Time Differentials" (TD's), when using LORAN there is an optional interface card. If the digital plotter is equipped with a TD interpolator the director 10 will guide a pencil stylus 3 with logarithmic accuracy, to the interpolated position. This feature is a significant improvement over the manual techniques of even the most experienced navigators.

WAYPOINT MODE. This mode is an interface mode only. It is not used to compute waypoints, but rather, and more usefully, to "upload" preselected waypoints to LORAN or Autopilots. This streamlines the process of quickly and accurately entering waypoints as follows:

Touch the desired waypoint on the chart with the pencil stylus 3. Always double check its latitude and longitude which is immediately displayed 6, 7. Press WAYPT 20 to input the waypoint to the LORAN or autopilot in NMEA 0183 format. The display panel will read "ACCEPTED" or "REJECTED". Once the waypoint has been entered into the LORAN or other electronic navigation instrument, the plotter returns to the POSITION mode.

Only some of the recent model LORANS are capable of accepting waypoint input from the digital plotter. The interface card will be an option which can be installed. No GPS receivers currently have waypoint capabilities; but several models will be available soon. The invention will interface with all of these models using the same interface card used for LORAN.

DEAD RECKONING MODE. This mode is entered by selecting the D/R mode menu 18. The plotter then assumes a position based on LORAN or GPS input or receives a bearing and generates a displayed position 6, 7. The DR mode evolves as follows:

Touch D/R 18 and press enter 26 on the pencil stylus to enter 0183 formation information from LORAN, GPS, DECCA or SATNAV gear; manual entry of latitude/longitude; or pencil stylus 3 position. Move the pencil stylus 3 on the chart until the director 10 indicates that the pencil stylus 3 and fix position are superimposed. If the navigator fees that a fix source is in error, he can compensate by offsetting the marked position accordingly. The position entered is that of the pencil stylus 3, not that dictated by the interfaced fix source. This selection feature allows the navigator ultimate control of the fixed source and correction for inaccuracies.

The DR mode is convenient when the navigator is at a known location; as he can simply press enter 26 while touching the known point on the chart (e.g. adjacent to a buoy). His position from which to DR is rapidly memorized by the plotter. When the plotter has received an initial position it next queries the user "GO TO?" Place the pencil stylus 3 on the destination or on the next waypoint and the longitude and latitude coordinates of the destination 6, 7, speed 8 towards the destination and time of arrival 9 are immediately displayed. The position displayed 6, 7 throughout this step will be the pencil stylus 3 location. Unlike other modes, the course and distance displayed will be that between the current DR position and the destination point.

The speed 8 and time 9 will flash until a speed in knots (or MPH) is selected on the speed strip 13. The time display 9 will scroll to show equivalent time for the selected speed. If a present timer versus speed is preferred, select time on the time strip 14 with the pencil stylus 3.

The determination of a DR time from a predicted time of arrival is also a useful feature for a navigator trying to rapidly compute what speed to use for a timed arrival, etc. Press enter 26 on the pencil stylus 3 to commence a dead reckoning. This function is overridden when receiving NMEA 0183 information. An entry of zero knots (or MPH) 13 for speed prompts a set and drift calculation from NMEA 0183 information.

The DR mode can be used to calculate set and drift, leeway and running fixes. For the celestial navigator, it is useful for rapidly advancing sun lines and LAN (Local Apparent Noon). Also, for the celestial navigator the electronic plotting of altitude intercept is greatly simplified, since there is no longer a need to draw the circle of equal altitude.

There are several further features and advanced uses of the DR mode for route planning and sailings. For instance, by using any scale mercator or separate charts, the navigator can layout a great circle route without a gnomic projection. The pencil stylus 3 is used to actually "trace" the track on the chart. In fact all DR courses are great circle courses, but the difference is not detectable on most large scale charts.

VISUAL FIX MODE. This mode is used to rapidly plot visual fixes with one or two people.

Touch VFIX 19 with the pencil stylus 3. The display panel 9 will read "NAVAID#1". Use the bearing scale 15 to select the bearing read out on the upper display 8. Touch the selected Navaid on the chart with the pencil stylus 3 and press enter 26. This correlates the Navaid and the bearing. The bearing and Navaid can be touched with the pencil stylus 3 in any order. Following enter, the lower display 9 will read "NAVAID#2". Using the pencil stylus 3 on the bearing scale 15 select a bearing that is again read out on the lower display 9. Touch the second Navaid 2 on the chart with the pencil stylus 3. Press enter 26.

The displayed latitude 6 and longitude 7 when "NAVAID#" is displayed corresponds to the location of the previously selected Navaid for the number. If the coordinates have not changed simply enter 26. The director 10 guides the pencil stylus 3 to the location of the previously selected Navaid.

The navigator can enter up to nine Navaids and press VFIX 19 to compute a fix. If only one LOP is entered it is crossed with the DR to obtain a running fix. All LOP's are advanced by DR information for maximum accuracy.

The visual fix is displayed on the director 10 relative to the location of vessel position. The graphical display provides a shaded area which when traced on the chart indicates the actual absolute accuracy of the fix.

If a second round of bearings is taken on the same Navaids only the bearings need be entered. This saves considerable time and allows the process to be completed by a single person. A bearing compass or ship's heading compass allows the automatic insertion of the bearings. This feature makes these visual fixes "real time". Move the pencil stylus 3 on the chart until the position mark is in the center of the director 10. The vessel location is in the middle of the director 10 just like a radar display.

Running fixes utilize the VFIX mode as above by maintaining an accurate DR; or using the SOG and COG format from NMEA 0183 information

RADAR MODE: This mode is nearly identical to the VFIX 13 mode. Instead of bearings, ranges are intersected to generate a position.

Initialize RADAR mode by touching RADAR 21. The upper display 8 requests "NAVAID#1?" The pencil stylus 3 is used to touch the Navaid on the plotting board or chart. The pencil is then drawn across the range scale 16 until the range displayed 9 equals the known range from radar, stadimeter or telemeter. Pressing enter 26 on stylus pencil 3 correlates the Navaid with the range. To compute a range either enter other ranges or cross it with a bearing in the VFIX mode.

What we claim is:

1. An electronic digital plotter for locating positions comprising:
    controller means for processing selected navigational data and chart data;
    board means, electronically linked to said controller means, allowing for the overlay of navigational chart means, said board means generating a variable X/Y coordinate matrix and detecting the position of stylus means within the X/Y coordinate matrix;
    display means, electronically linked to said controller means, for indicating the position of said stylus means relative to a predetermined position on said navigational chart means;
    input means, electronically linked to said controller means, for inputting said selected navigational data and said chart data to said controller means.

2. an electronic digital plotter according to claim 1, further comprising:
    means, electronically linked to said controller means, for indicating the position of said stylus means on said navigational chart means hereby a readout of a chart position is visually displayed.

3. An electronic digital plotter according to claim 1, further comprising:
    means for inputting position data to said controller means comprising an actuating switch means, which, when actuated, inputs the position of said stylus means on said board means to said controller means.

4. An electronic digital plotter according to claim 1, wherein said stylus means comprises means for marking the position of the stylus means on the navigational chart means.

5. An electronic digital plotter according to claim 1, wherein said input means comprises a means for inputting data from at least one electronic position indicating means selected from the group consisting of Loran, Satnav, GPs, Decca, Omega, radar and electronic compass.

6. An electronic digital plotter according to claim 1, wherein said input means comprises a means for manually inputting data whereby said data is input by a user through a keypad or a keyboard.

7. An electronic digital plotter according to claim 1, further comprising:
    output means, electronically linked to said controller means, for communicating navigational data to an electronic navigational instrument.

8. An electronic digital plotter according to claim 1, wherein the board means is a rigid board which uses electromagnetic or capacitative resistance means to generate the coordinate matrix.

9. An electronic digital plotter according to claim 1, wherein the board means is a flexible board which uses electromagnetic or capacitative resistance means to generate the coordinate matrix, wherein said board can be rolled up for storage.

10. An electronic digital plotter according to claim 1, wherein the board means is sized to receive standard chart book inserts as the navigational chart means.

11. An electronic digital plotter according to claim 1, wherein the board means is sized to receive standard NOAA charts as the navigational chart means.

12. An electronic digital plotter according to claim 10, wherein the board means is adapted to accurately detect said stylus means through a ½" stack of navigational chart means.

13. An electronic digital plotter according to claim 1, wherein display means comprises a visual bull's eye style display.

14. An electronic digital plotter according to claim 3, further comprising:
    means, electronically linked to said controller means, for indicating the position of said stylus means on said navigational chart means whereby a readout of a chart position is visually displayed.

15. An electronic digital plotter according to claim 14, wherein said input means comprises a means for manually inputting data whereby said data is input by a user through a keypad or a keyboard.

16. An electronic digital plotter according to claim 15, further comprising:
    output means, electronically linked to said controller means, for communicating navigational data to an electronic navigational instrument.

17. An electronic digital plotter according to claim 15, wherein said input means comprises a means for inputting data from at least one electronic position indicating means selected from the group consisting of Loran, Satnav, GPS, Decca, Omega, radar and electronic compass.

18. An electronic digital plotter according to claim 16, wherein said input means comprises a means for inputting data from at least one electronic position indicating means selected from the group consisting of Loran, Satnav, GPS, Decca, Omega, radar and electronic compass.

19. An electronic digital plotter according to claim 14, wherein said stylus means comprises means for marking the position of the stylus means on the navigational chart means.

20. An electronic digital plotter according to claim 15, wherein said stylus means comprises means for marking the position of the stylus means on the navigational chart means.

* * * * *